(12) United States Patent
Ogaki et al.

(10) Patent No.: US 12,508,951 B2
(45) Date of Patent: Dec. 30, 2025

(54) BATTERY TEMPERATURE REGULATING METHOD AND CONTROL DEVICE

(71) Applicant: HONDA MOTOR CO., LTD., Tokyo (JP)

(72) Inventors: Toru Ogaki, Tokyo (JP); Shuhei Kouchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 245 days.

(21) Appl. No.: 18/388,394

(22) Filed: Nov. 9, 2023

(65) Prior Publication Data

US 2024/0157848 A1 May 16, 2024

(30) Foreign Application Priority Data

Nov. 11, 2022 (JP) ................................ 2022-181122

(51) Int. Cl.
*B60L 58/24* (2019.01)

(52) U.S. Cl.
CPC ......... *B60L 58/24* (2019.02); *B60L 2240/662* (2013.01); *B60L 2240/80* (2013.01); *B60L 2260/56* (2013.01)

(58) Field of Classification Search
CPC .......... B60L 58/24; B60L 58/26; B60L 58/27; B60L 2240/545; B60L 2240/662;

(Continued)

(56) References Cited

U.S. PATENT DOCUMENTS

2011/0316486 A1* 12/2011 Inaba .................... H01M 10/48
320/150
2020/0212515 A1* 7/2020 King ................... H02J 7/00034
(Continued)

FOREIGN PATENT DOCUMENTS

EP 4046859 A1 * 8/2022 ............ H01M 10/61
JP 2012-075282 A 4/2012
(Continued)

*Primary Examiner* — Calvin Cheung
(74) *Attorney, Agent, or Firm* — Paratus Law Group, PLLC

(57) ABSTRACT

A battery temperature regulating method includes: acquiring outside temperature information representing a future outside temperature transition around the vehicle, searching for an intersection time, which is a time when the outside temperature becomes a threshold temperature, predicting, based on the outside temperature information, a future temperature transition of the battery when it is assumed that predetermined temperature regulation is performed each time the battery reaches the threshold temperature, creating a temperature regulating plan for the battery, which is performed by the temperature regulating device, based on a search result of the intersection time and a prediction result of the temperature transition of the battery, and controlling the temperature regulating device based on the temperature regulating plan. In the processing of creating the temperature regulating plan, the temperature regulating plan in which details of the temperature regulation performed when the battery once reaches the threshold temperature is adjusted is created.

5 Claims, 9 Drawing Sheets

(58) Field of Classification Search
CPC ............ B60L 2240/80; B60L 2260/56; H01M 10/613; H01M 10/615; H01M 10/625; H01M 10/633; H01M 10/635; Y02E 60/10

See application file for complete search history.

(56) References Cited

U.S. PATENT DOCUMENTS

| | | | |
|---|---|---|---|
| 2021/0031654 A1* | 2/2021 | Vizzini | .................. B60L 58/12 |
| 2021/0210810 A1* | 7/2021 | Chuang | ..................... B60L 1/02 |
| 2021/0221254 A1* | 7/2021 | Abe | ........................ B60L 58/26 |

FOREIGN PATENT DOCUMENTS

| | | | | |
|---|---|---|---|---|
| JP | 2016-116357 A | 6/2016 | | |
| WO | WO-2014045776 A1 * | 3/2014 | ............. | B60L 58/27 |

* cited by examiner

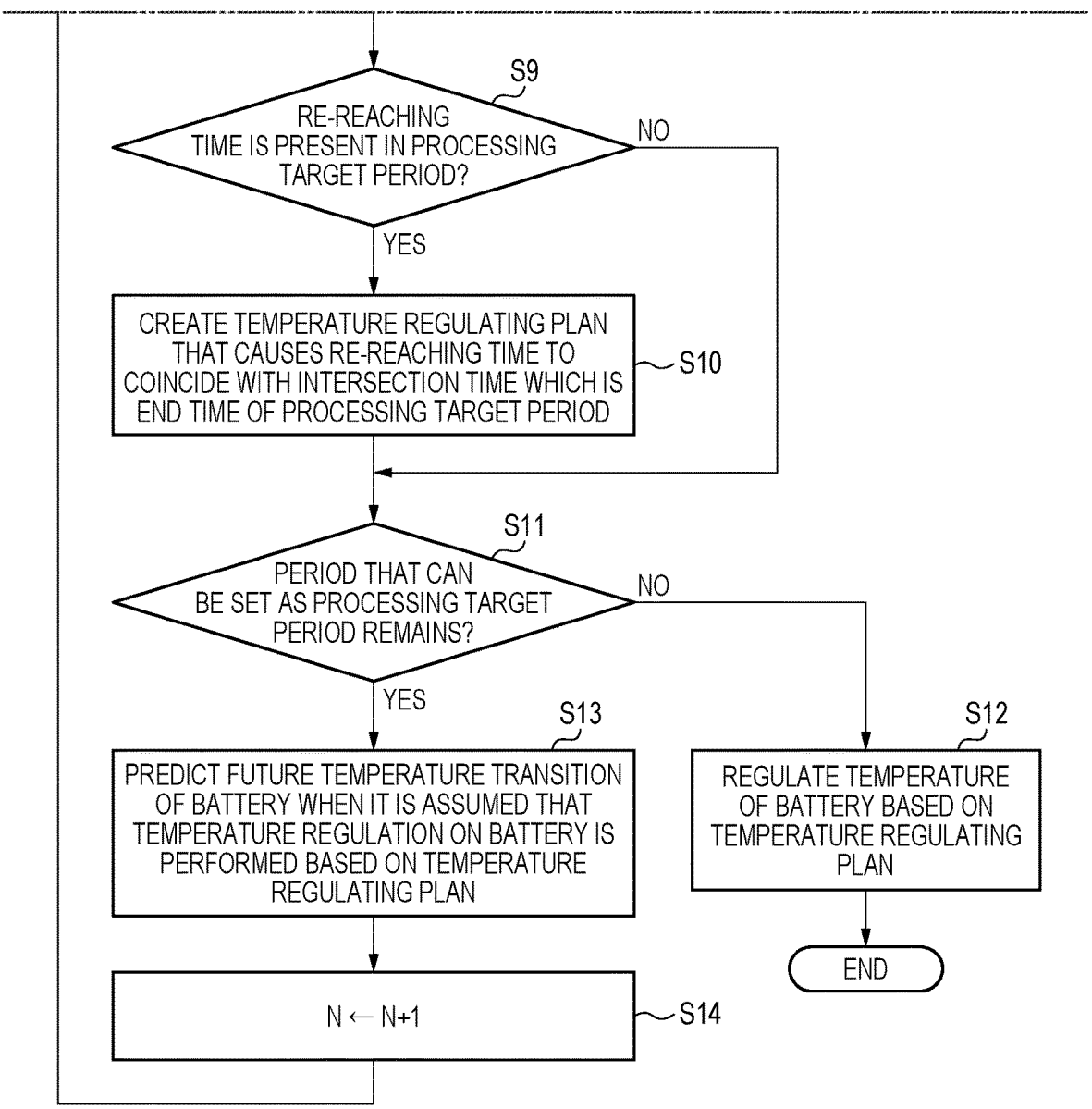

BATTERY TEMPERATURE REGULATING METHOD AND CONTROL DEVICE

CROSS-REFERENCE TO RELATED APPLICATIONS

This application is based on and claims priority under 35 USC 119 from Japanese Patent Application No. 2022-181122 filed on Nov. 11, 2022, the entire content of which is incorporated herein by reference.

TECHNICAL FIELD

The present invention relates to a battery temperature regulating method and a control device.

BACKGROUND ART

In recent years, as a specific countermeasure against global climate change, efforts for realizing a low-carbon society or a decarbonized society have become active. Also, in a vehicle such as an automobile, a reduction in $CO_2$ emissions and an improvement in energy efficiency are required, and electrification of a drive source is progressing. For example, an electric vehicle provided with a motor (also referred to as a "traction motor") as a drive source that drives drive wheels, and a battery as a power supply that supplies power to the motor is developed.

If a battery is in a high temperature state, deterioration of the battery may proceed remarkably. Even if a state of charge (SOC) is high to some extent and the battery is in a low temperature state, deterioration of the battery may progress significantly. From a viewpoint of reducing the progression of such deterioration, it is desirable to keep the battery mounted on a vehicle at an appropriate temperature even when the vehicle is left unattended (for example, the vehicle is parked).

As a technique to reduce deterioration of a battery when parking, for example, JP2012-075282A discloses a technique in which a temperature of an in-vehicle battery during a parking time from a start of parking until a predetermined time elapses is predicted, the temperature of the in-vehicle battery when charging is performed is further predicted based on the predicted temperature of the in-vehicle battery, and a charging plan of the in-vehicle battery is created based on the prediction.

JP2016-116357A discloses a technique in which a battery temperature transition is estimated based on a temperature of a battery and information on weather factors for each of a plurality of parking direction candidates, and among the plurality of parking direction candidates, the candidate that is estimated to maintain the temperature of the battery within a predetermined temperature range is notified to a driver.

SUMMARY OF INVENTION

However, in the related technique, there is room for improvement from a viewpoint of maintaining a battery at an appropriate temperature when a vehicle is left unattended, and reducing power consumption of a temperature regulating device that performs temperature regulation on the battery.

Aspect of non-limiting embodiments of the present disclosure relates to provide a battery temperature regulating method and a control device capable of maintaining a battery at an appropriate temperature when a vehicle is left unattended and reducing power consumption of a temperature regulating device that performs temperature regulation on the battery.

The present invention further contributes to improvement of energy efficiency.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to the present invention, a battery temperature regulating method and a control device capable of maintaining a battery at an appropriate temperature when a vehicle is left unattended and reducing power consumption of a temperature regulating device that performs temperature regulation on the battery can be provided.

DESCRIPTION OF EMBODIMENTS

Figure 1:
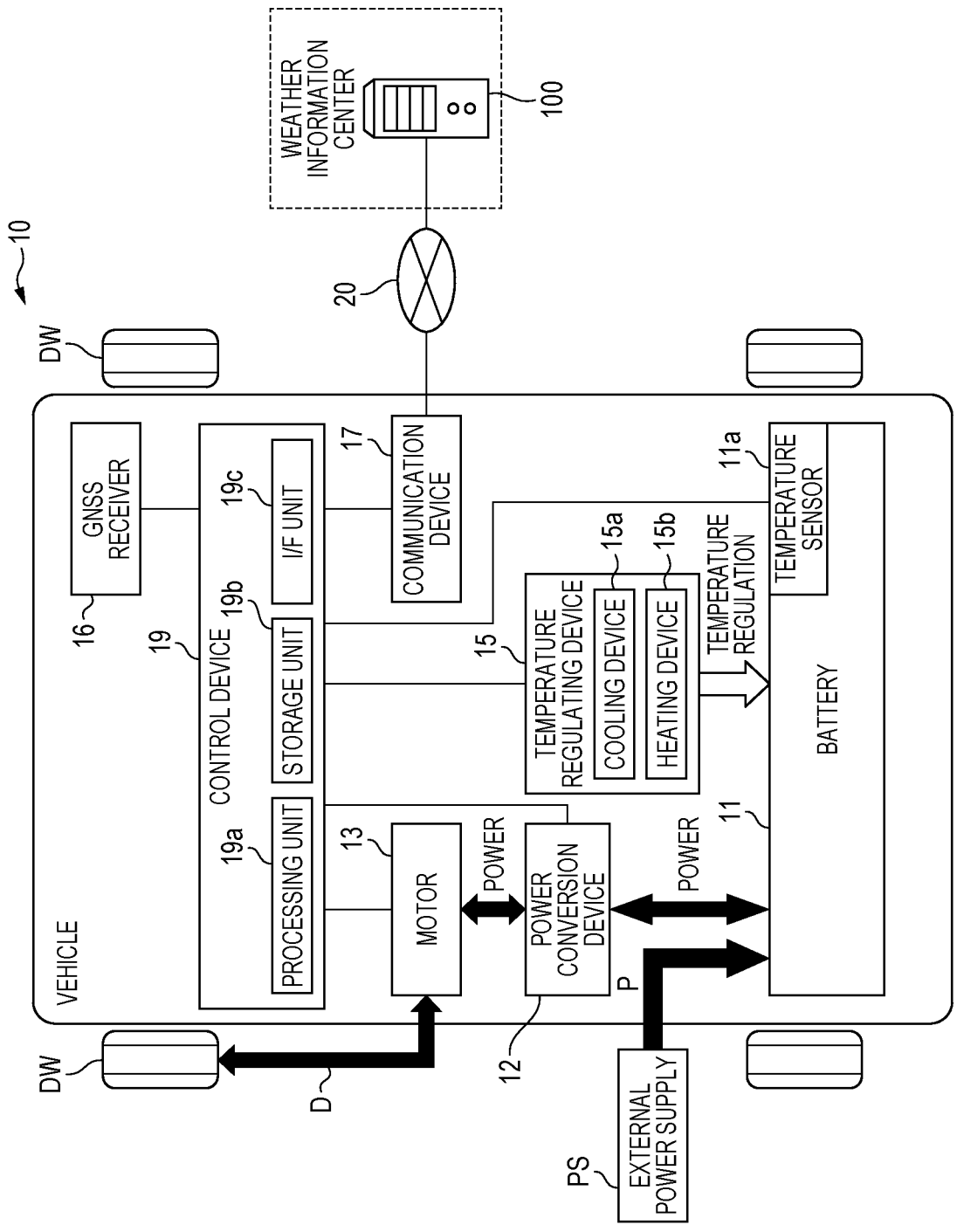
FIG. 1 is a diagram showing a vehicle 10 equipped with a battery 11 whose temperature is to be regulated.

Hereinafter, an embodiment of a battery temperature regulating method and a control device according to the present invention will be described in detail with reference to the drawings. The drawings are viewed in directions of reference numerals. The following embodiments do not limit the invention described in the scope of claims, and not all combinations of features described in the embodiments are essential to the invention. Two or more of the features described in the embodiments may be combined freely. In the following description, the same or similar elements are denoted by the same or similar reference numerals, and a description thereof may be omitted or simplified as appropriate.

[Vehicle]

First, an example of a vehicle equipped with a battery whose temperature is to be regulated (temperature regulated) by the temperature regulating method according to the present invention will be described. As shown in FIG. 1, a vehicle 10 according to the present embodiment is an electric vehicle including a battery 11 that is a rechargeable secondary battery, a motor 13 configured to drive drive wheels DW by being supplied with power from the battery 11, and a power conversion device 12 that converts power transferred between the battery 11 and the motor 13.

The battery 11 is configured to be charged with power P received from an external power supply PS, for example. The external power supply PS is, for example, a commercial power supply that supplies alternating current having a predetermined voltage (for example, 100 [V] to 200 [V]) and a predetermined frequency (for example, 50 [Hz] to 60 [Hz]).

Specifically, the vehicle 10 is configured to be electrically connected to the external power supply PS. Electrical connection between the vehicle 10 and the external power supply PS may be established by a physical connector, a cable, or the like, or may be established by wireless power transfer. When wireless power transfer is adopted, a method of power transfer may be an electromagnetic induction type, a magnetic resonance type, a combination of the electromagnetic induction type and the magnetic resonance type, or the like.

The power P received from the external power supply PS is converted from alternating current to direct current by a charger (not shown) provided in the vehicle 10, is converted to a voltage suitable for charging the battery 11, and then is supplied to the battery 11. Accordingly, the vehicle 10 can charge the battery 11 with the power P received from the external power supply PS.

The battery 11 is configured to output a high voltage (for example, 100 [V] to 400 [V]) by connecting a plurality of storage cells in series, and is connected to the motor 13 via the power conversion device 12. A lithium-ion battery, a nickel-metal hydride battery, or the like can be used as the storage cell of the battery 11. The vehicle 10 is also provided with, for example, a battery temperature sensor 11a that detects a temperature of the battery 11 (hereinafter, also referred to as "battery temperature"), and a detection signal indicating the battery temperature detected by the battery temperature sensor 11a is sent to a control device 19 described below. Accordingly, the control device 19 can acquire the battery temperature detected by the battery temperature sensor 11a.

The power conversion device 12 includes an inverter, converts the direct current output from the battery 11 into alternating current, and supplies the obtained alternating current to the motor 13 implemented by an alternating current motor (for example, a three-phase alternating current motor). The power conversion device 12 may further include, for example, a DC/DC converter, and convert a voltage of the power transferred between the battery 11 and the motor 13.

The motor 13 is connected to the drive wheels DW via a power transmission device (not shown) included in the vehicle 10, and outputs a driving force (driving force for running) D for driving the vehicle 10 to the drive wheels DW by being supplied with power. Therefore, the vehicle 10 can run with the driving force output by the motor 13 by supplying the power of the battery 11 to the motor 13. That is, the motor 13 is a so-called "traction motor".

The motor 13 can regeneratively generate power as the vehicle 10 is braked, and output the generated power (alternating current) to the power conversion device 12. In this case, the power conversion device 12 converts alternating current output from the motor 13 into direct current and supplies the obtained direct current to the battery 11. Accordingly, the vehicle 10 can also charge the battery 11 with the power generated by the motor 13 as the vehicle 10 is braked.

Furthermore, the vehicle 10 includes a temperature regulating device 15 configured to regulate the temperature of the battery 11, a global navigation satellite system (GNSS) receiver 16 configured to identify a current position of the vehicle 10, a communication device 17 configured to communicate with an external device of the vehicle 10, and the control device 19 that comprehensively controls the entire vehicle 10.

The temperature regulating device 15 performs the temperature regulation on the battery 11 under the control of the control device 19. In the present embodiment, the temperature regulating device 15 includes a cooling device 15a configured to cool the battery 11 and a heating device 15b configured to heat the battery 11, and is configured to perform cooling and heating on the battery 11 as the temperature regulation of the battery 11. As the cooling device 15a, for example, a fan that blows cooling air to the battery 11 may be used, or a water-cooling cooling device that circulates cooling water such as a long life coolant (LLC) may be used. As the heating device 15b, for example, an electric heater that is supplied with power to generate heat can be used.

The GNSS receiver 16 identifies the current position of the vehicle 10 based on a signal received from a GNSS satellite, and outputs position information indicating the current position of the vehicle 10 (hereinafter, also simply referred to as "position information") to the control device 19 described below. The vehicle 10 may further include a navigation device. In this case, for example, the navigation device determines a route (hereinafter, also referred to as a "guidance route") from the current position identified by the GNSS receiver 16 to a destination set by a user (for example, a driver) of the vehicle 10 by referring to map data or the like, and guides the user by displaying the determined guidance route on a display.

The communication device 17 is an in-vehicle communication device configured to communicate with an external device of the vehicle 10 via a network 20 and communicates with the external device of the vehicle 10 under the control of the control device 19. The network 20 can be, for example, a mobile communication network, but is not limited thereto, and may be the Internet, a wide area network (WAN), a local area network (LAN) including Wi-Fi (registered trademark), or the like.

In the present embodiment, the communication device 17 can communicate with a server 100 of a weather information center managed by a service provider who distributes weather information for each region. The server 100 is configured to distribute, for example, information representing a future temperature transition in each area.

The control device 19 is a computer that comprehensively controls the entire vehicle 10 including the power conversion device 12, the motor 13, the temperature regulating device 15, and the communication device 17, and is an example of the control device according to the present invention. The control device 19 is implemented by an electric control unit (ECU) or the like, and includes a processing unit 19a, a storage unit 19b such as a random access memory (RAM) and a read only memory (ROM), and an I/F unit 19c (interface unit) that controls input and output of data between the inside and the outside of the control device 19.

The processing unit 19a is a processor such as a central processing unit (CPU), and executes a program stored in the storage unit 19b. The storage unit 19b stores the program executed by the processing unit 19a as well as data used for processing by the processing unit 19a. The control device 19 may be implemented by one ECU, or may be implemented by a cooperative operation of a plurality of ECUs.

For example, the control device 19 (in other words, the processing unit 19a) controls the temperature regulating device 15 to perform the temperature regulation on the battery 11 when the vehicle 10 is left unattended. The description that "when the vehicle 10 is left unattended" means, for example, a case where an ignition power supply of the vehicle 10 is OFF, and can also be referred to as "when the vehicle 10 is parked". Since details of the temperature regulating method for the battery 11 which is performed by the control device 19 will be described later, a description is omitted here.

The control device 19 controls the communication device 17 at a predetermined timing to communicate with the server 100 to acquire from the server 100 outside temperature information representing a future outside temperature transition (hereinafter, also simply referred to as "outside temperature information") around the vehicle 10. As an example, the control device 19 transmits a distribution request including the position information received from the GNSS receiver 16 to the server 100 via the communication device 17. In response to reception of the distribution request, the server 100 transmits, to the communication device 17 which is a distribution request source, information representing a future temperature transition in an area (for example, a city, a town, and a village) to which the current position of the vehicle 10 belongs as the outside temperature information. The communication device 17 outputs the outside temperature information received from the server 100 to the control device 19.

Accordingly, the control device 19 can acquire the outside temperature information.

[Battery Temperature Regulating Method]

If the battery 11 deteriorates, a cruising distance of the vehicle 10 is shortened, and convenience of the vehicle 10 may be decreased. Although it is conceivable to replace the battery 11 when the battery 11 deteriorates, a battery that supplies power to the traction motor, such as battery 11, is generally a high capacity and high output battery, and replacement thereof can be costly.

From a viewpoint of preventing a decrease in the convenience of the vehicle 10, reducing a maintenance cost of the vehicle 10, or securing a resale value when selling the vehicle 10, it is desirable to reduce deterioration of the battery 11 as much as possible. In particular, it is important to regulate the temperature of the battery 11 when the vehicle 10 is left unattended (for example, when parked), which can occupy most of a life cycle of the vehicle 10, from the viewpoint of reducing the deterioration of the battery 11.

Therefore, when the vehicle 10 is left unattended, the control device 19 controls the temperature regulating device 15 by the temperature regulating method described below to perform the temperature regulation on the battery 11. Accordingly, it is possible to maintain the battery 11 at an appropriate temperature by avoiding the battery 11 from becoming a high temperature state or a low temperature state when the vehicle 10 is left unattended. Therefore, the deterioration of the battery 11 can be reduced when the vehicle 10 is left unattended, which can occupy most of the life cycle of the vehicle 10, and marketability of the vehicle 10 can be improved by preventing a decrease in the convenience of the vehicle 10, an increase in the maintenance cost of the vehicle 10, or a decrease in the resale value of the vehicle 10 due to the deterioration of the battery 11.

(1-1. Example of Temperature Regulating Method when Battery is Cooled)

First, an example of cooling the battery 11 as the temperature regulation on the battery 11 when the vehicle 10 is left unattended will be described with reference to FIGS. 2 to 6. For example, when the vehicle 10 is left unattended in a high-temperature area where a temperature is high, the battery 11 can be cooled as follows.

Figure 2:
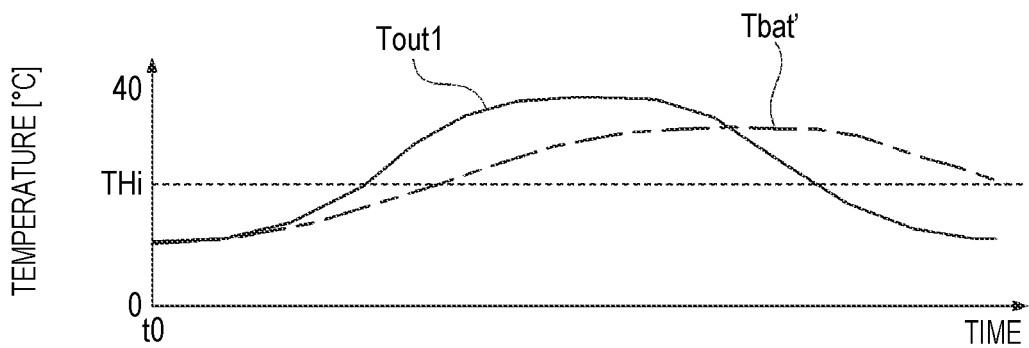
FIG. 2 is a diagram showing a first example of an outside temperature transition represented by outside temperature information acquired by a control device 19.

First, the control device 19 acquires outside temperature information from the server 100 via the network 20, for example, when the ignition power supply of the vehicle 10 is turned off. Here, it is assumed that the outside temperature information representing an outside temperature transition Tout1 shown in FIG. 2 is acquired.

The outside temperature transition Tout1 represents an outside temperature transition around the vehicle 10 from a present time t0 to 24 hours later (that is, for one day from the present time). In general, the temperature during one day is higher in the daytime, and is lower in the early morning and at night than that in the daytime. Therefore, the outside temperature transition Tout1 represents the outside temperature in a mountain shape.

The outside temperature during a part period (for example, during the daytime) of the outside temperature represented by the outside temperature transition Tout1 exceeds a high-temperature side threshold temperature THi, which is predetermined in consideration of durability of the battery 11 against a high temperature and the like. The high-temperature side threshold temperature THi is an example of a threshold temperature, and can be set to 30[° C.], for example.

If the temperature regulation of the battery 11 is not performed when the vehicle 10 is left unattended, by using the outside temperature as a main heat source, the battery temperature transitions with a time lag with respect to the outside temperature. A battery temperature transition Tbat' shown in FIG. 2 represents a temperature transition of the battery 11 with respect to the outside temperature transition Tout1 when the temperature regulation (here, cooling) on the battery 11 is not performed.

In the example shown in FIG. 2, since a part of the outside temperature represented by the outside temperature transition Tout1 exceeds the high-temperature side threshold temperature THi, a part of the battery temperature represented by the battery temperature transition Tbat' also exceeds the high-temperature side threshold temperature THi.

In this way, if the temperature regulation of the battery 11 is not performed when the vehicle 10 is left unattended, the battery temperature may exceed the high-temperature side threshold temperature THi, and in this case, the control device 19 cools the battery 11 with the cooling device 15a when the vehicle 10 is left unattended, so that the battery temperature does not exceed the high-temperature side threshold temperature THi. Accordingly, it is possible to reduce the deterioration of the battery 11 due to the battery temperature exceeding the high-temperature side threshold temperature THi by preventing the battery temperature from exceeding the high-temperature side threshold temperature THi when the vehicle 10 is left unattended.

Specifically, in this case, first, the control device 19 searches for intersection times, which are times when the outside temperature reaches the high-temperature side threshold temperature THi, based on the acquired outside temperature information. That is, the intersection times in this case can also be referred to as times corresponding to intersections of the outside temperature and the high-temperature side threshold temperature THi on the graph.

Figure 3:
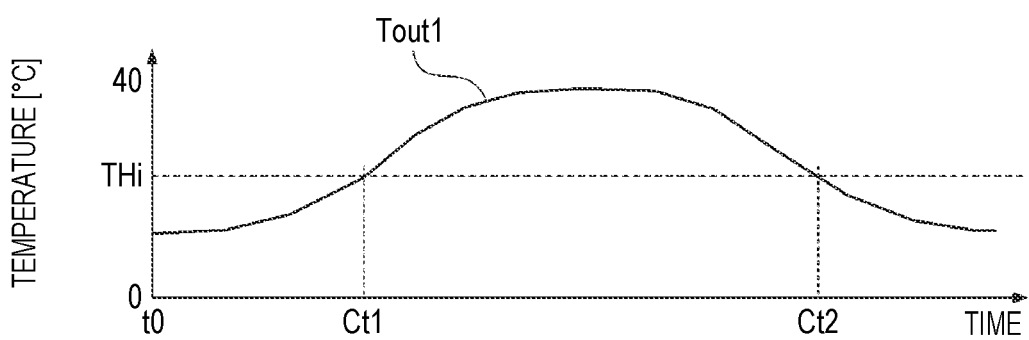
FIG. 3 is a diagram showing an example of intersection times searched for by the control device 19.

For example, as shown in FIG. 3, if the acquired outside temperature information represents the outside temperature transition Tout1, an intersection time Ct1 and an intersection time C2 are searched for as the intersection times. Here, the intersection time Ct1 is a time when the outside temperature, which is lower than the high-temperature side threshold temperature THi, rises to the high-temperature side threshold temperature THi, and is a first intersection time before the intersection time Ct2 in time series. The intersection time Ct2 is a time when the outside temperature, which is higher than the high-temperature side threshold temperature THi, drops and reaches the high-temperature side threshold temperature THi, and is a next (that is, second) intersection time after the intersection time Ct1.

Next, based on the acquired outside temperature information, the control device 19 predicts the future temperature transition of the battery 11 when it is assumed that predetermined cooling is performed each time the battery 11 reaches the high-temperature side threshold temperature THi. Hereinafter, control for performing the predetermined cooling each time the battery 11 reaches the high-temperature side threshold temperature THi is also referred to as "normal cooling control".

Figure 4:
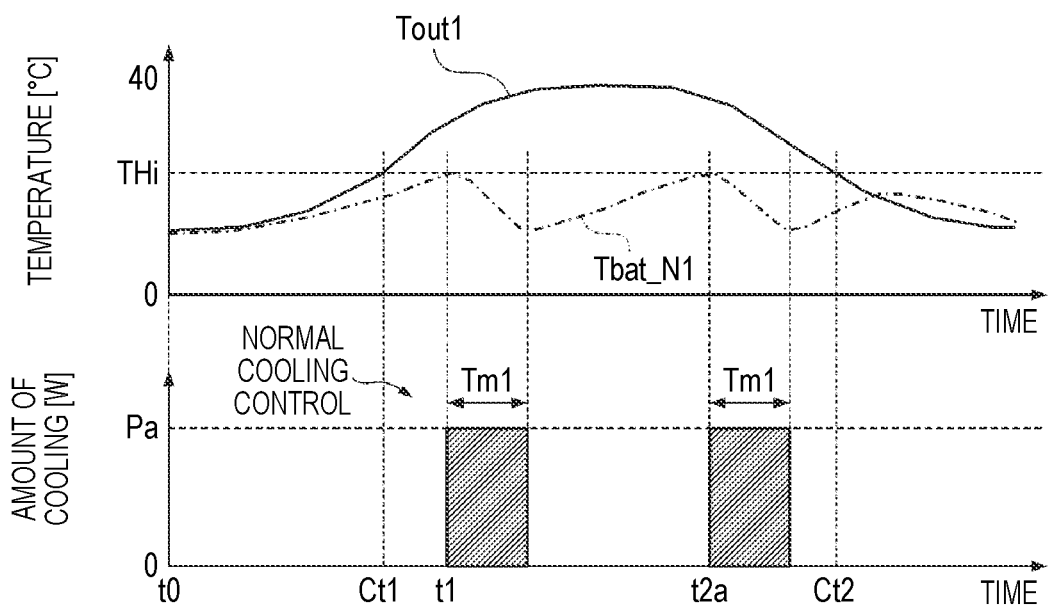
FIG. 4 is a diagram showing an example of a future temperature transition of the battery 11 when it is assumed that the control device 19 performs normal cooling control.

As shown in FIG. 4, the normal cooling control is, for example, control to operate the cooling device 15a (that is, the temperature regulating device 15) to cool the battery 11 with an amount of cooling of Pa [W] per unit time over a period Tm1 from each time (respectively a time t1 and a time t2a in an example shown in FIG. 4) when the battery 11 reaches the high-temperature side threshold temperature THi.

The Pa [W] can be, for example, an upper limit amount of cooling of the cooling device 15a when the vehicle 10 is left unattended, but is not limited thereto, and may be a predetermined amount of cooling lower than the upper limit amount of cooling. The Pa [W] and the period Tm1 are set in advance for the control device 19 by a manufacturer of the vehicle 10, for example.

Here, a battery temperature transition Tbat_N1 shown in FIG. 4 is predicted as the future temperature transition of the battery 11 when it is assumed that the normal cooling control is performed. The control device 19 can predict the battery temperature transition Tbat_N1 based on the outside temperature transition Tout1, the amount of cooling of the normal cooling control, a heat capacity (thermal mass) of the battery 11, and the like.

As an example, a battery temperature $T_x$ [° C.] at a time $t_x$ can be expressed as shown in the following Formula (1) using a battery temperature $T_{x-1}$ [° C.] at a time $t_{x-1}$ which is a time before the time $t_x$ by a $\Delta t$ [s].

[Formula 1]

$$T_x = T_{x-1} + \frac{Q}{C} \times \Delta t \quad (1)$$

In the above Formula 1, Q [W] represents an amount of heat generated in the battery 11 at the time $t_x$, and for example, is a sum of an amount of cooling and heating by the temperature regulating device 15 at the time $t_x$, an amount of cooling or heating by the outside temperature at the time $t_x$, and an amount of self-heating of the battery 11 at the time $t_x$. The C [J/K] represents the heat capacity of the battery 11.

For example, the control device 19 can sequentially obtain the battery temperatures at respective times in an interval of $\Delta t$ [s] (for example, 600 [s]) from the current time by using the above Formula (1) to predict the future temperature transition of the battery 11.

Next, the control device 19 creates a temperature regulating plan indicating future temperature transition details of the battery 11 performed by the temperature regulating device 15 based on a search result of the intersection times and a prediction result of the temperature transition of the battery 11 when it is assumed that the normal cooling control is performed. The temperature regulating plan includes, for example, information indicating when and how to operate the temperature regulating device 15.

When creating the temperature regulating plan, the control device 19, for example, first sets a period between the intersection times adjacent in the time series as a processing target period. Accordingly, here, as shown in FIG. 5, a period from the intersection time Ct1 to the intersection time Ct2 is set as a processing target period Ttar1.

Next, the control device 19 determines whether a re-reaching time, which is a time when the battery 11 once reaching the high-temperature side threshold temperature THi reaches the high-temperature side threshold temperature THi again, is present in the set processing target period Ttar1. That is, the control device 19 determines whether the re-reaching time is present after the intersection time Ct1 which is a start time of the processing target period Ttar1 and before the intersection time Ct2 which is an end time of the processing target period Ttar1.

Figure 5:
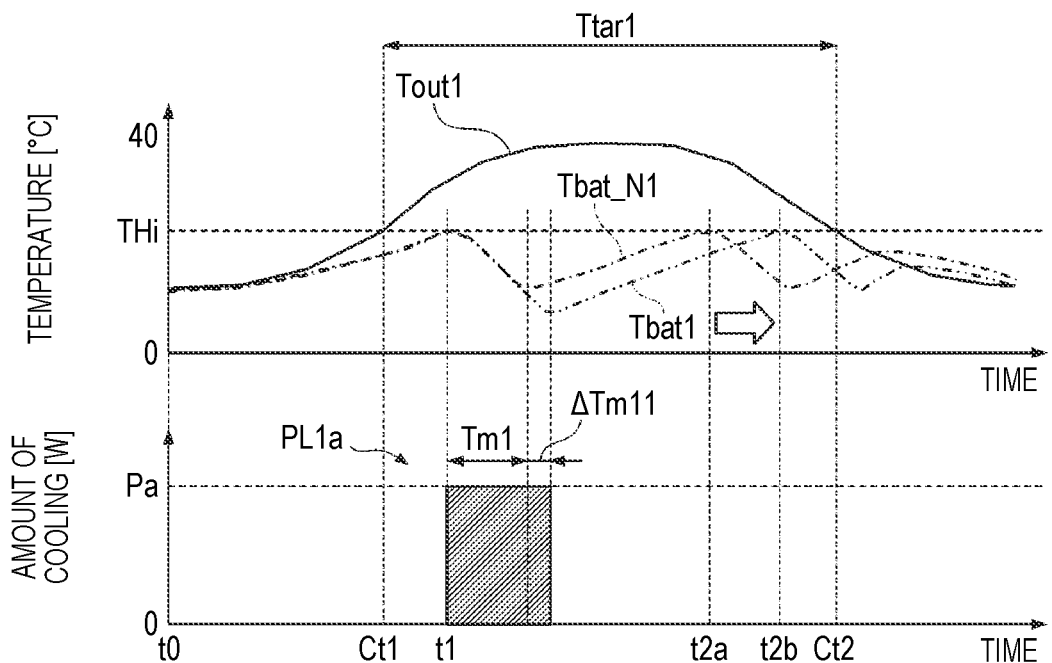
FIG. 5 is a diagram showing an example of a temperature regulating plan in which a re-reaching time is brought closer to the intersection time.

In the battery temperature transition Tbat_N1 shown in FIG. 5, the battery 11 once reaches the high-temperature side threshold temperature THi at the time t1 within the processing target period Ttar1, and the battery 11 reaches the high-temperature side threshold temperature THi again at the time t2a within the processing target period Ttar1. In this case, the time t2a becomes the re-reaching time. Accordingly, in this case, the control device 19 determines that the re-reaching time is present before the intersection time Ct2 which is the end time of the processing target period Ttar1.

In this way, if the control device 19 determines that the re-reaching time is present before the intersection time Ct2 which is the end time of the set processing target period Ttar1, the control device 19 creates a temperature regulating plan PL1a in which the cooling performed from the time t1 when the battery 11 reaches the high-temperature side threshold temperature THi once is extended by a period ΔTm11 from the initial period Tm1. The ΔTm11 is preset for the control device 19 by the manufacturer of the vehicle 10, for example.

A battery temperature transition Tbat1 shown in FIG. 5 represents a future temperature transition of the battery 11 when it is assumed that the temperature regulation of the battery 11 is performed based on the temperature regulating plan PL1a, that is, when it is assumed that the cooling is performed for the period Tm1+the period ΔTm11 from the time t1. The control device 19 can predict the battery temperature transition Tbat1 based on the outside temperature transition Tout1, the amount of cooling by the temperature regulating plan PL1a, the heat capacity of the battery 11, and the like.

As shown in FIG. 5, in the case where the temperature regulation of the battery 11 is performed based on the temperature regulating plan PL1a, the battery temperature can be further decreased by cooling from the time t1 compared with the case where the normal cooling control is performed (that is, a case where the cooling is performed from the time t1 to the period Tm1). Accordingly, when the temperature of the battery 11 is regulated based on the temperature regulating plan PL1a, as indicated by a white arrow in FIG. 5, the re-reaching time can be shifted from the initial time t2a to a time t2b after the time t2a. In other words, the re-reaching time can be brought closer to the intersection time Ct2 which is the end time of the processing target period Ttar1.

By the way, even if it is assumed that the temperature regulation on the battery 11 is performed based on the temperature regulating plan PL1a, the re-reaching time (here, the time t2b) is present before the intersection time Ct2 which is the end time of the processing target period Ttar1. In such a case, for example, the control device 19 newly creates a temperature regulating plan in which the time for the cooling performed from the time t1 is extended longer than the period ΔTm11 with respect to the initial period Tm1. Then, the control device 19 repeats such processing until the re-reaching time coincides with the intersection time Ct2.

Figure 6:
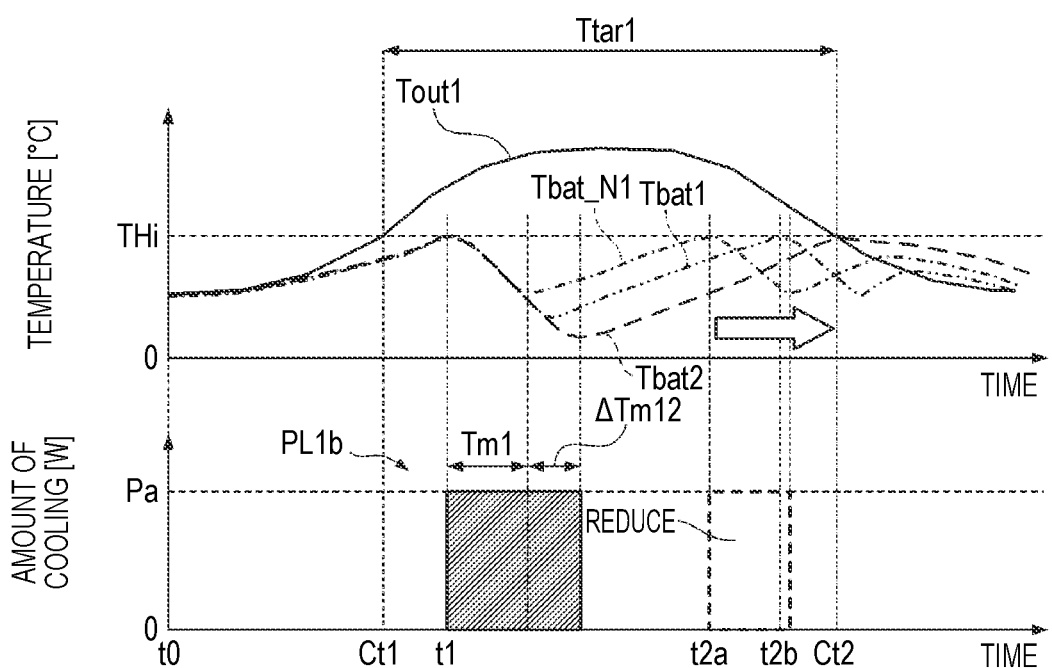
FIG. 6 is a diagram showing an example of a temperature regulating plan in which the re-reaching time coincides with the intersection time.

A battery temperature transition Tbat2 shown in FIG. 6 represents a future temperature transition of the battery 11 when it is assumed that the time for the cooling performed from the time t1 is extended by a period ΔTm12 (where ΔTm12>ΔTm11) with respect to the initial period Tm1.

As shown in FIG. 6, the re-reaching time coincides with the intersection time Ct2 when it is assumed that the cooling is performed for the period Tm1+period ΔTm12 from the time t1. In this case, the control device 19 adopts, as the temperature regulating plan actually used for regulating the temperature of the battery 11, a temperature regulating plan PL1b in which the time for the cooling performed from the time t1 is extended by the period ΔTm12 from the initial period Tm1.

Accordingly, in this case, the control device 19 controls the temperature regulating device 15 based on the temperature regulating plan PL1b to perform the temperature regulation on the battery 11. More specifically, the control device 19 operates the cooling device 15a with the amount of cooling of Pa [W] per unit time from the time t1 over the period Tm1+the period ΔTm12. Accordingly, as shown in FIG. 6, the control device 19 can prevent the battery temperature from exceeding the high-temperature side threshold temperature THi by operating the cooling device 15a only once during the period from the time t0 to 24 hours later.

Accordingly, compared with the case where the cooling device 15a is operated by the normal cooling control shown in FIG. 4, it is possible to reduce a chance of operating the cooling device 15a and reduce the power consumption of the cooling device 15a.

As shown in FIG. 6, the control device 19 can operate the cooling device 15a based on the temperature regulating plan PL1b to set, as the high-temperature side threshold temperature THi, a battery temperature at the intersection time Ct2 when the outside temperature becomes equal to or lower than the high-temperature side threshold temperature THi. Accordingly, the control device 19 can prevent excessive cooling by the cooling device 15a and reduce the power consumption of the cooling device 15a.

Specifically, the main heat source that increases the battery temperature when the vehicle 10 is left unattended is the outside temperature. Therefore, if the battery temperature at the intersection time Ct2 is set to be equal to or lower than the high-temperature side threshold temperature THi, the battery 11 can be kept at or below the high-temperature side threshold temperature THi by natural heat radiation. In other words, cooling by the cooling device 15a such that the battery temperature at the intersection time Ct2 falls below the high-temperature side threshold temperature THi may result in the excessive cooling.

Accordingly, by setting the battery temperature at the intersection time Ct2 to the high-temperature side threshold temperature THi as described above, the control device 19 can use the outside temperature as much as possible to maintain the battery 11 at an appropriate temperature, thereby preventing the excessive cooling by the cooling device 15a and reducing the power consumption of the cooling device 15a.

In the example described above, the temperature regulating plan PL1b that causes the re-reaching time to coincide with the intersection time Ct2 is created, and the cooling device 15a is controlled based on the temperature regulating plan PL1b, but the present invention is not limited thereto. For example, the control device 19 may create the temperature regulating plan PL1a that brings the re-reaching time closer to the intersection time Ct2, and control the cooling device 15a based on the temperature regulating plan PL1a. Also in this way, compared with the case where the normal cooling control is performed, the battery temperature at the intersection time Ct2 can be brought closer to the high-temperature side threshold temperature THi, and thus, the outside temperature can be used as much as possible to maintain the battery 11 at an appropriate temperature, thereby preventing the excessive cooling by the cooling device 15a and reducing the power consumption of the cooling device 15a.

For example, a situation may occur in which the control device 19 cannot obtain the outside temperature information because the communication device 17 cannot connect to the network 20, or the like. Here, if the outside temperature information cannot be acquired, the control device 19 may control the cooling device 15a by the normal cooling control. For example, in this case, the control device 19 acquires the battery temperature detected by the battery temperature sensor 11a at a predetermined interval, and may operate the cooling device 15a over the period Tm1 with the amount of cooling of Pa [W] per unit time if the control device 19 determines that the acquired battery temperature reaches the high-temperature side threshold temperature THi. In this way, even if the outside temperature information cannot be acquired, the control device 19 can prevent the battery 11 from exceeding the high-temperature side threshold temperature THi, and can maintain the battery 11 at an appropriate temperature.

In the example described above, by extending the cooling period from the time when the battery 11 reaches the high-temperature side threshold temperature THi once, the re-reaching time is brought closer to the intersection time which is the end time of the processing target period, but the present invention is not limited thereto. For example, by decreasing a target temperature of the battery 11 by cooling the battery 11 whose temperature once reaches the high-temperature side threshold temperature THi, the re-reaching time may be brought closer to the intersection time which is the end time of the processing target period. The normal cooling control may be, for example, control to cool the battery 11 to a predetermined target temperature each time the battery 11 reaches the high-temperature side threshold temperature THi.

In the example described above, the control device 19 creates a temperature regulating plan corresponding to a period of approximately one day, but the present invention is not limited thereto. If outside temperature information corresponding to a period of multiple days can be acquired, the control device 19 may create a temperature regulating plan corresponding to the period of multiple days based on the outside temperature information. In this way, for example, even if the vehicle 10 is left unattended for a long period of time, it is possible to prevent the temperature from being excessively regulated by the temperature regulating device 15 in consideration of a temperature (in other words, weather) of each day during the leaving.

(1-2. Another Example of Temperature Regulating Method when Battery is Cooled)

An example in which the control device 19 creates a temperature regulating plan corresponding to a period of multiple days will be described below with reference to FIGS. 7A to 7D.

Figure 7A:
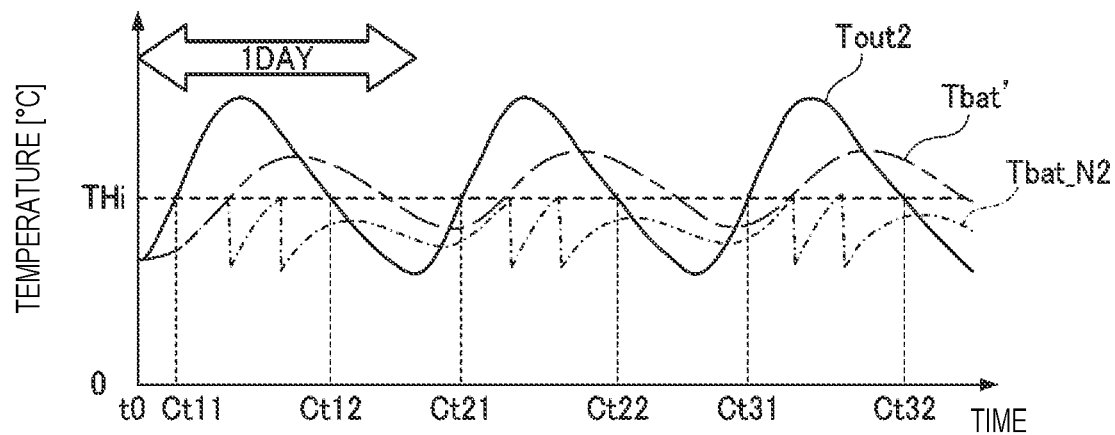
FIG. 7A is a diagram showing a second example of the outside temperature transition represented by the outside temperature information acquired by the control device 19.

Here, the control device 19 acquires outside temperature information representing an outside temperature transition Tout2 shown in FIG. 7A. The outside temperature transition Tout2 represents a transition of the outside temperature around the vehicle 10 for approximately three days from the current time to.

A battery temperature transition Tbat' shown in FIG. 7A represents a future temperature transition of the battery 11 with respect to the outside temperature transition Tout2 when the temperature regulation (here, cooling) on the battery 11 is not performed. A battery temperature transition Tbat_N2 shown in FIG. 7A represents a future temperature transition of the battery 11 when it is assumed that the normal cooling control is performed.

As shown in FIG. 7A, when the acquired outside temperature information represents the outside temperature transition Tout2, an intersection time Ct11, an intersection time Ct12, an intersection time Ct21, an intersection time Ct22, an intersection time Ct31, and an intersection time Ct32 (that is, three or more intersection times) are searched for as the intersection times. In this way, when three or more intersection times are searched for, the control device 19 performs the processing described with reference to FIGS. 2 to 6 and the like for each period between the intersection times adjacent in the time series.

Figure 7B:
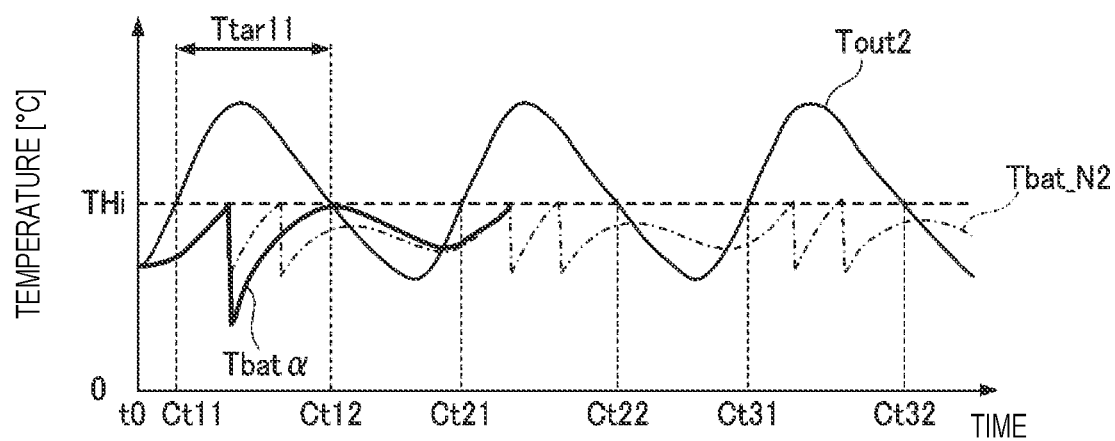
FIG. 7B is a diagram showing an example of a temperature regulating plan that optimizes temperature regulation on the battery 11 during a processing target period Ttar11.

Specifically, first, as shown in FIG. 7B, the control device 19 sets a period from the intersection time Ct11 to the intersection time Ct12 on the first day as a processing target period Ttar11. The control device 19 determines whether a re-reaching time is present in the set processing target period Ttar11, and if the control device 19 determines that the re-reaching time is present, the control device 19 creates a temperature regulating plan that causes the re-reaching time to coincide with the intersection time Ct12 which is the end time of the processing target period Ttar11. Accordingly, the control device 19 can create a temperature regulating plan that optimizes the temperature regulation on the battery 11 in the processing target period Ttar11. A battery temperature transition Tbatα shown in FIG. 7B represents a future temperature transition of the battery 11 when it is assumed that the temperature regulation on the battery 11 is performed based on the temperature regulating plan that optimizes the temperature regulation on the battery 11 in the processing target period Ttar11.

Figure 7C:
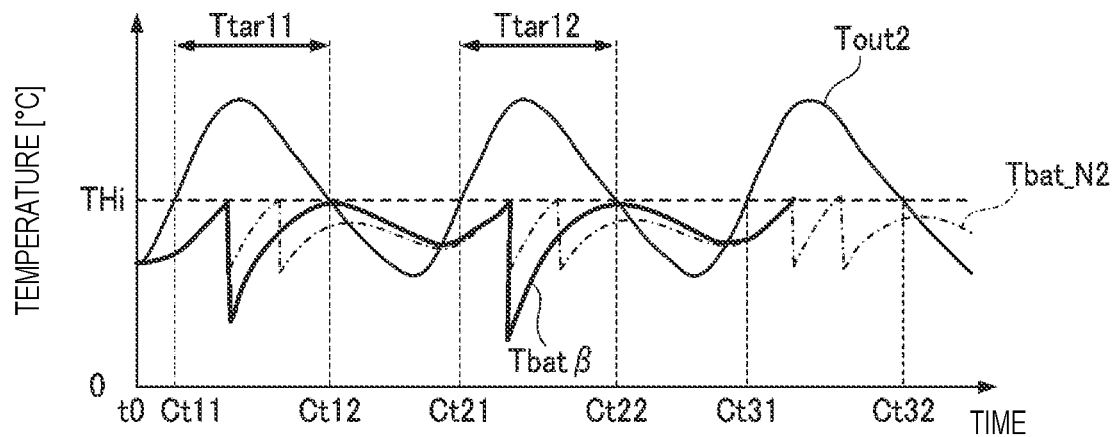
FIG. 7C is a diagram showing an example of temperature regulating plans that optimize the temperature regulation on the battery 11 in the processing target period Ttar11 and a processing target period Ttar12.

Then, as shown in FIG. 7C, the control device 19 sets a period from the intersection time Ct21 to the intersection time Ct22 on the second day as a processing target period Ttar12, and also creates a temperature regulating plan that optimizes the temperature regulation on the battery 11 for the processing target period Ttar12. A battery temperature transition Tbatβ shown in FIG. 7C represents a future temperature transition of the battery 11 when it is assumed that the temperature regulation on the battery 11 is performed based on the temperature regulating plans that optimize the temperature regulation on the battery 11 in the processing target period Ttar11 and the processing target period Ttar12.

Figure 7D:
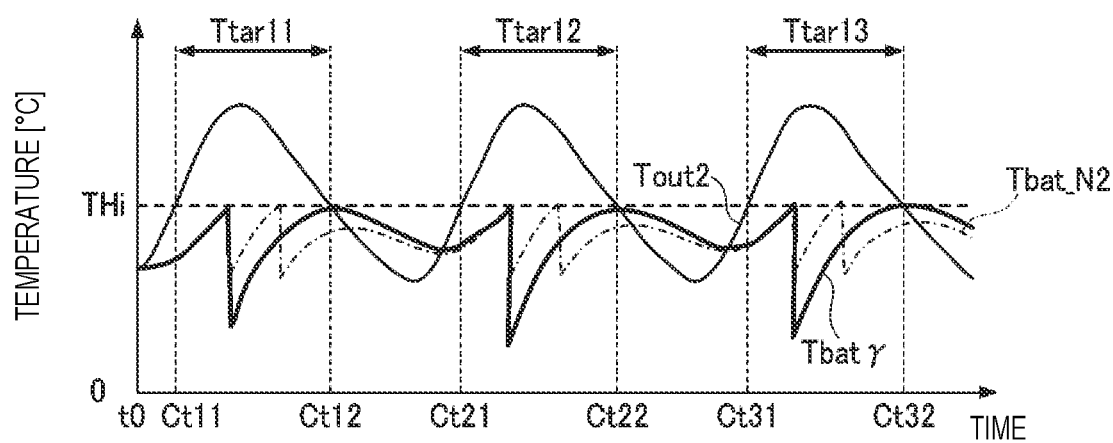
FIG. 7D is a diagram showing an example of temperature regulating plans that optimize the temperature regulation on the battery 11 in the processing target period Ttar11, the processing target period Ttar12, and a processing target period Ttar13.

Then, as shown in FIG. 7D, the control device 19 sets a period from the intersection time Ct31 to the intersection time Ct32 on the third day as a processing target period Ttar13, and also creates a temperature regulating plan that optimizes the temperature regulation on the battery 11 for the processing target period Ttar13. Accordingly, the control device 19 can create the temperature regulating plans that optimize the temperature regulation on the battery 11 in the processing target period Ttar11, the processing target period Ttar12, and the processing target period Ttar13.

The control device 19 operates the cooling device 15a based on the temperature regulating plans that optimize the temperature regulation on the battery 11 in the processing target period Ttar11, the processing target period Ttar12, and the processing target period Ttar13, so that it is possible to transition the battery temperature as represented by a battery temperature transition Tbatγ in FIG. 7D.

As described above, for example, when three or more intersection times are searched for, the control device 19 performs the processing described with reference to FIGS. 2 to 6 and the like for each period between the intersection times adjacent in the time series. Accordingly, the control device 19 can create a temperature regulating plan that optimizes the temperature regulation on the battery 11 for a period of multiple days including three or more intersection times. Accordingly, even when the vehicle 10 is left unattended for a long period of time, the outside temperature can be used as much as possible to maintain the battery 11 at an appropriate temperature, thereby preventing excessive cooling by the cooling device 15a and reducing the power consumption of the cooling device 15a. That is, the control device 19 can prevent the temperature from being excessively regulated by the temperature regulating device 15 (here, excessively cooled by the cooling device 15a) in consideration of the temperature of each day when the vehicle 10 is left unattended.

(2-1. Example of Temperature Regulating Method when Battery is Heated)

Next, an example of heating the battery 11 as the temperature regulation on the battery 11 when the vehicle 10 is left unattended will be described with reference to FIGS. 8 to 10. For example, when a state of charge (SOC) of the battery 11 is relatively high and the vehicle 10 is left unattended in a low temperature area where a temperature is low, the battery 11 can be heated as follows. Since a basic procedure of the heating of the battery 11 is the same as that of the cooling of the battery 11 described above, the following description will be simplified or omitted as appropriate.

Figure 8:
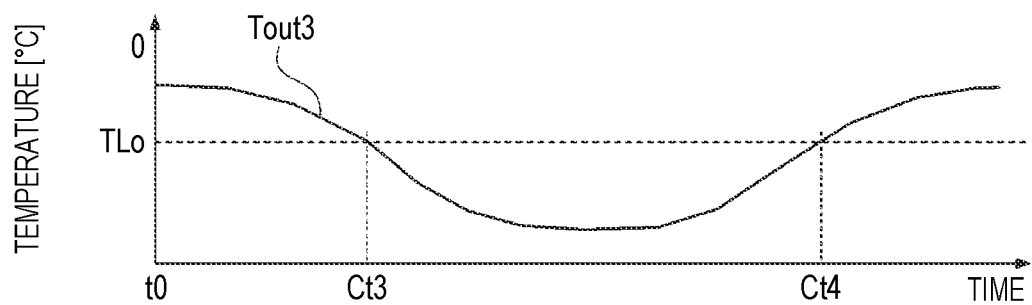
FIG. 8 is a diagram showing a third example of the outside temperature transition represented by the outside temperature information acquired by the control device 19.

Here, outside temperature information representing outside temperature transition Tout3 shown in FIG. 8 is acquired. The outside temperature transition Tout3 represents an outside temperature transition around the vehicle 10 from the present time t0 to 24 hours later (that is, for one day from the present time).

The outside temperature during a part period of the outside temperature represented by the outside temperature transition Tout3 falls below a low-temperature side threshold temperature TLo which is predetermined in consideration of durability of the battery 11 against a low temperature and the like. The low-temperature side threshold temperature TLo is another example of the threshold temperature, and can be set to −10[° C.], for example. The control device 19 may vary the low-temperature side threshold temperature TLo according to the SOC of the battery 11.

If the temperature regulation (here, heating) on the battery 11 is not performed with respect to the outside temperature transition Tout3, the battery temperature may fall below the low-temperature side threshold temperature TLo. In this way, if the temperature regulation on the battery 11 is not performed when the vehicle 10 is left unattended, the battery temperature may fall below the low-temperature side threshold temperature TLo, and in this case, the control device 19 heats the battery 11 with the heating device 15b when the vehicle 10 is left unattended, so that the battery temperature does not fall below the low-temperature side threshold temperature TLo. Accordingly, it is possible to reduce the deterioration of the battery 11 due to the battery temperature falling below the low-temperature side threshold temperature TLo by preventing the battery temperature from falling below the low-temperature side threshold temperature TLo when the vehicle 10 is left unattended.

Specifically, in this case, first, the control device 19 searches for an intersection time, which is a time when the outside temperature becomes the low-temperature side threshold temperature TLo, based on the acquired outside temperature information. That is, the intersection time in this case can also be referred to as a time corresponding to an intersection of the outside temperature and the low-temperature side threshold temperature TLo on the graph.

For example, as shown in FIG. 8, if the acquired outside temperature information represents the outside temperature transition Tout3, an intersection time Ct3 and an intersection time Ct4 are searched for as the intersection times. Here, the intersection time Ct3 is a time when the outside temperature higher than the low-temperature side threshold temperature TLo decreases to the low-temperature side threshold temperature TLo, and is a first intersection time before the intersection time Ct4 in the time series. The intersection time Ct4 is a time when the outside temperature lower than the low-temperature side threshold temperature TLo rises and reaches the low-temperature side threshold temperature TLo, and is a next (that is, second) intersection time after the intersection time Ct3.

Next, based on the acquired outside temperature information, the control device 19 predicts a future temperature transition of the battery 11 when it is assumed that predetermined heating is performed each time the battery 11 reaches the low-temperature side threshold temperature TLo. Hereinafter, control for performing the predetermined heating each time the battery 11 reaches the low-temperature side threshold temperature TLo is also referred to as "normal heating control".

Figure 9:
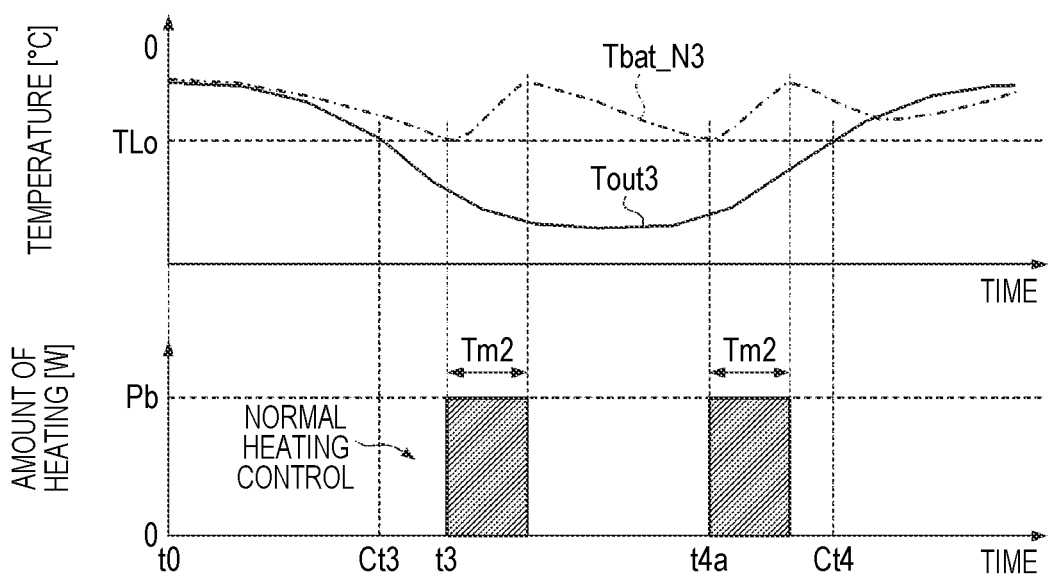
FIG. 9 is a diagram showing an example of a future temperature transition of the battery 11 when it is assumed that the control device 19 performs normal heating control.

As shown in FIG. 9, the normal heating control is, for example, control to operate the heating device 15b (that is, the temperature regulating device 15) to heat the battery 11 with an amount of heating of Pb [W] per unit time over a period Tm2 from each time (respectively a time t3 and a time t4a in an example shown in FIG. 9) when the battery 11 reaches the low-temperature side threshold temperature TLo.

The Pb [W] can be, for example, an upper limit amount of heating of the heating device 15b when the vehicle 10 is left unattended, but is not limited thereto, and may be a predetermined amount of heating less than the upper limit amount of heating. The Pb [W] and the period Tm2 are set in advance for the control device 19 by the manufacturer of the vehicle 10, for example.

Here, a battery temperature transition Tbat_N3 shown in FIG. 9 is predicted as a future temperature transition of the battery 11 when it is assumed that the normal heating control is performed. The control device 19 can predict the battery temperature transition Tbat_N3 based on the outside temperature transition Tout3, the amount of heating by the normal heating control, the heat capacity of the battery 11, and the like.

Next, the control device 19 creates a temperature regulating plan based on a search result of the intersection times and a prediction result of the temperature transition of the battery 11 when it is assumed that the normal heating control is performed. When creating the temperature regulating plan, the control device 19, for example, first sets a period between the intersection times adjacent in the time series as a processing target period. Accordingly, here, as shown in FIG. 10, a period from the intersection time Ct3 to the intersection time Ct4 is set as a processing target period Ttar2.

Next, the control device 19 determines whether a re-reaching time, which is a time when the battery 11 once reaching the low-temperature side threshold temperature TLo reaches the low-temperature side threshold temperature TLo again, is present in the set processing target period Ttar2. That is, the control device 19 determines whether the re-reaching time is present after the intersection time Ct3 which is a start time of the processing target period Ttar2 and before the intersection time Ct4 which is an end time of the processing target period Ttar2.

Figure 10:
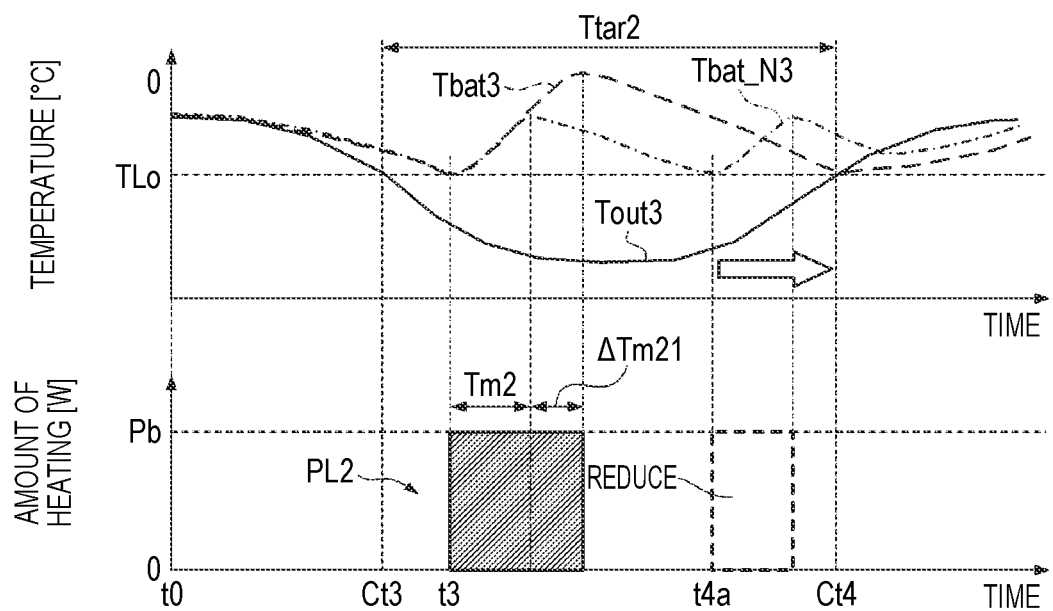
FIG. 10 is a diagram showing another example of the temperature regulating plan in which the re-reaching time coincides with an intersection time.

In the battery temperature transition Tbat_N3 shown in FIG. 10, the battery 11 once reaches the low-temperature side threshold temperature TLo at the time t3 within the processing target period Ttar2, and the battery 11 reaches the low-temperature side threshold temperature TLo again at the time t4a within the processing target period Ttar2. In this case, the time t4a becomes the re-reaching time. Accordingly, in this case, the control device 19 determines that the re-reaching time is present before the intersection time Ct4 which is the end time of the processing target period Ttar2.

In this way, if the control device 19 determines that the re-reaching time is present before the intersection time Ct2 which is the end time of the set processing target period Ttar2, as shown in FIG. 10, by adjusting the heating performed from the time t3 when the battery 11 once reaches the low-temperature side threshold temperature TLo (for example, extending the heating from the time t3 by a period ΔTm21 from the initial period Tm2), the control device 19 creates a temperature regulating plan PL2 such that the re-reaching time coincides with the intersection time Ct4 which is the end time of the processing target period Ttar2. Accordingly, the control device 19 can create a temperature regulating plan that optimizes the temperature regulation on the battery 11 in the processing target period Ttar2.

A battery temperature transition Tbat3 shown in FIG. 10 represents a future temperature transition of the battery 11 when it is assumed that the temperature regulation on the battery 11 is performed based on the temperature regulating plan PL2 that optimizes the temperature regulation on the battery 11 in the processing target period Ttar2.

In this case, the control device 19 controls the temperature regulating device 15 based on the temperature regulating plan PL2 to perform the temperature regulation on the battery 11. More specifically, the control device 19 operates the heating device 15*b* with the amount of heating of Pb [W] per unit time from the time t3 over the period Tm2+the period ΔTm21. Accordingly, as shown in FIG. 10, the control device 19 can prevent the battery temperature from falling below the low-temperature side threshold temperature TLo by operating the heating device 15*b* only once during the period from the time t0 to 24 hours later. Accordingly, compared with the case where the heating device 15*b* is operated by the normal heating control shown in FIG. 9, as shown in FIG. 10, it is possible to reduce a chance of operating the heating device 15*b* and reduce power consumption of the heating device 15*b*.

As shown in FIG. 10, the control device 19 can operate the heating device 15*b* based on the temperature regulating plan PL2 to set, as the low-temperature side threshold temperature TLo, a battery temperature at the intersection time Ct4 when the outside temperature becomes equal to or higher than the low-temperature side threshold temperature TLo. Accordingly, the control device 19 can use the outside temperature as much as possible to maintain the battery 11 at an appropriate temperature, thereby preventing excessive heating by the heating device 15*b* and reducing the power consumption of the heating device 15*b*.

In the example described above, the temperature regulating plan PL2 that causes the re-reaching time to coincide with the intersection time Ct4 is created, and the heating device 15*b* is controlled based on the temperature regulating plan PL2, but the present invention is not limited thereto. For example, the control device 19 may create a temperature regulating plan that brings the re-reaching time closer to the intersection time Ct4 without coinciding with the intersection time Ct4, and control the heating device 15*b* based on the created temperature regulating plan. Also in this way, compared with the case where the normal heating control is performed, the battery temperature at the intersection time Ct4 can be brought closer to the low-temperature side threshold temperature TLo, and thus, the outside temperature can be used as much as possible to maintain the battery 11 at an appropriate temperature, thereby preventing the excessive heating by the heating device 15*b* and reducing the power consumption of the heating device 15*b*.

If the outside temperature information cannot be acquired, the control device 19 may control the heating device 15*b* by the normal heating control. For example, in this case, the control device 19 acquires the battery temperature detected by the battery temperature sensor 11*a* at a predetermined interval, and may operate the heating device 15*b* over the period Tm2 with the amount of heating of Pb [W] per unit time if the control device 19 determines that the acquired battery temperature reaches the low-temperature side threshold temperature TLo. In this way, even if the outside temperature information cannot be acquired, the control device 19 can prevent the battery 11 from falling below the low-temperature side threshold temperature TLo, and can maintain the battery 11 at an appropriate temperature.

In the example described above, by extending the heating period from a time when the battery 11 once reaches the low-temperature side threshold temperature TLo, the re-reaching time is brought closer to the intersection time which is the end time of the processing target period, but the present invention is not limited thereto. For example, by increasing a target temperature of the battery 11 by heating the battery 11 whose temperature once reaches the low-temperature side threshold temperature TLo, the re-reaching time may be brought closer to the intersection time which is the end time of the processing target period. The normal heating control may be, for example, control to heat the battery 11 to a predetermined target temperature each time the battery 11 reaches the low-temperature side threshold temperature TLo.

(2-2. Another Example of Temperature Regulating Method when Battery is Heated)

As described above, when three or more intersection times are searched for, such as in a case where the control device 19 creates a temperature regulating plan corresponding to a period of multiple days, the control device 19 may perform the processing described with reference to FIG. 10 and the like for each period between intersection times adjacent in the time series.

Figure 11:
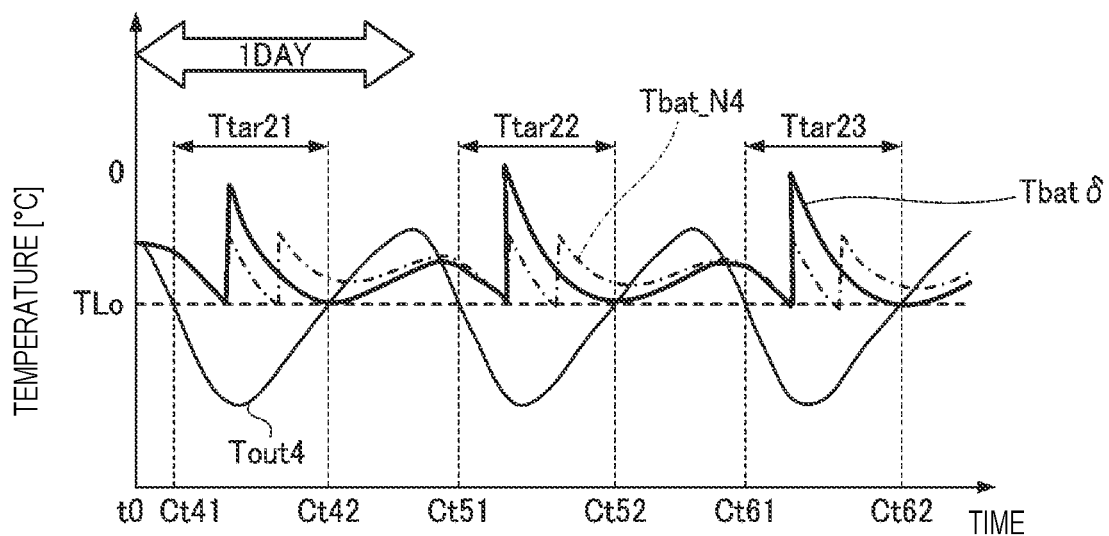
FIG. 11 is a diagram showing an example of temperature regulating plans that optimize temperature regulation on the battery 11 in a processing target period Ttar21, a processing target period Ttar22, and a processing target period Ttar23.

For example, as shown in FIG. 11, when the acquired outside temperature information represents an outside temperature transition Tout4, an intersection time Ct41, an intersection time Ct42, an intersection time Ct51, an intersection time Ct52, an intersection time Ct61, and an intersection time Ct62 (that is, three or more intersection times) are searched for as the intersection times.

In this case, the control device 19 may create temperature regulating plans that sequentially optimize the temperature regulation of the battery 11 for respective processing target periods of a processing target period Ttar21 from the intersection time Ct41 to the intersection time Ct42, a processing target period Ttar22 from the intersection time Ct51 to the intersection time Ct52, and a processing target period Ttar23 from the intersection time Ct61 to the intersection time Ct62.

By operating the temperature regulating device 15 (here, the heating device 15*b*) based on the temperature regulating plans that optimize the temperature regulation on the battery 11 in the processing target period Ttar21, the processing target period Ttar22, and the processing target period Ttar23, it is possible to cause the battery temperature to transition as represented by a battery temperature transition Tbatδ shown in FIG. 11. In this regard, a battery temperature transition Tbat_N4 shown in FIG. 11 represents a future temperature transition of the battery 11 when it is assumed that the normal heating control is performed.

As described above, for example, when three or more intersection times are searched for, the control device 19 performs the processing described with reference to FIG. 10 and the like for each period between the intersection times adjacent in the time series. Accordingly, the control device 19 can create a temperature regulating plan that optimizes the temperature regulation on the battery 11 for a period of multiple days including three or more intersection times. Accordingly, even if the vehicle 10 is left unattended for a long period of time, the outside temperature can be used as much as possible to maintain the battery 11 at an appropriate temperature, thereby preventing excessive heating by the heating device 15b and reducing the power consumption of the heating device 15b. That is, the control device 19 can prevent the temperature from being excessively regulated by the temperature regulating device 15 (here, excessively heated by the heating device 15b) in consideration of the temperature of each day when the vehicle 10 is left unattended.

[Example of Processing Executed by Control Device]

Figure 12:
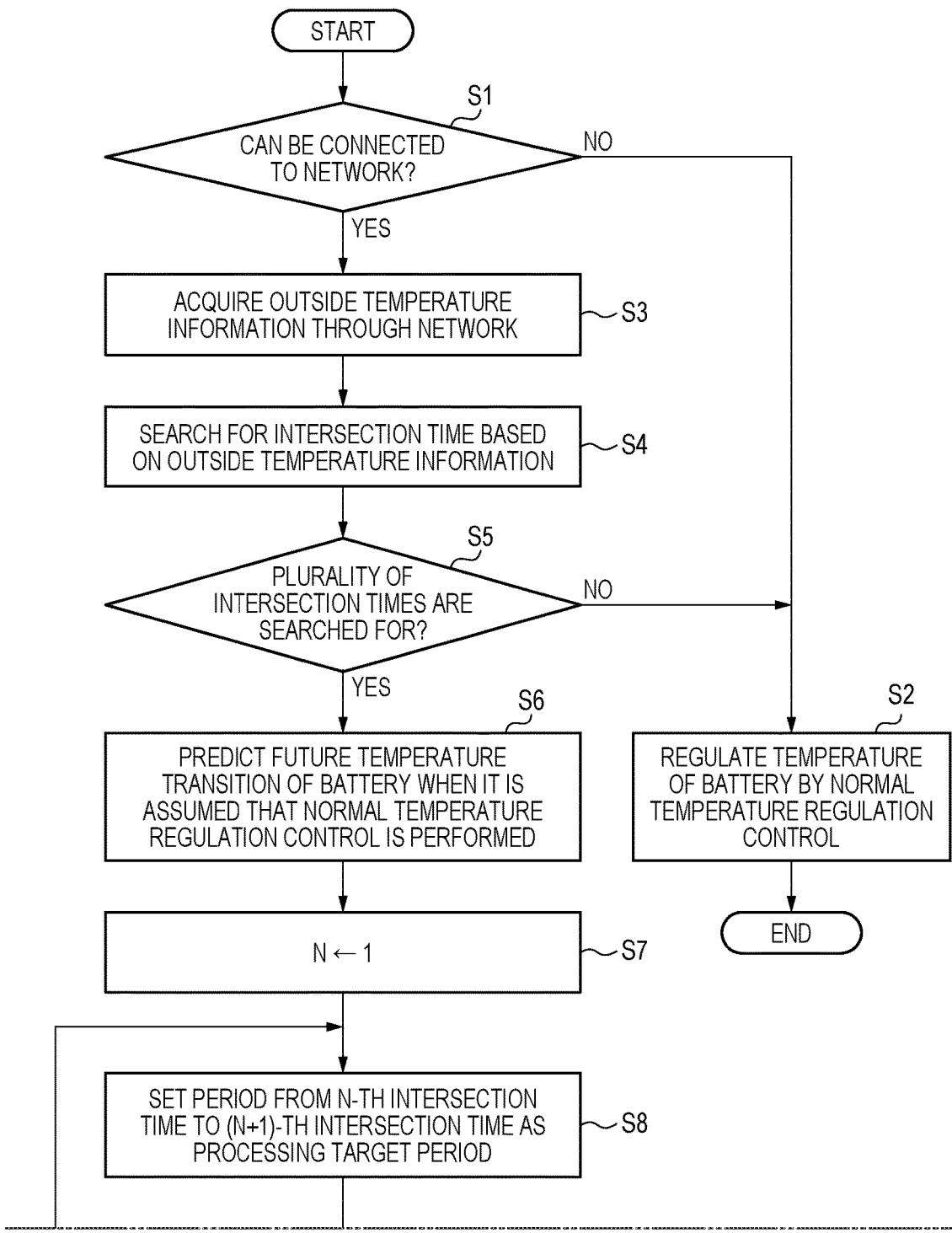
FIG. 12 is a flowchart showing an example of processing executed by the control device 19.

Next, an example of processing executed by the control device 19 will be described with reference to FIG. 12. The control device 19 performs a series of processing shown in FIG. 12, for example, when the ignition power supply of the vehicle 10 is OFF (that is, when the vehicle 10 is left unattended).

First, the control device 19 determines whether the communication device 17 can be connected to the network 20 (step S1). If the control device 19 determines that the communication device 17 cannot be connected to the network 20 (step S1: No), the control device 19 controls the temperature regulating device 15 by normal temperature regulation control to regulate the temperature of the battery 11 (step S2), and ends the series of processing shown in FIG. 12. Here, the normal temperature regulation control includes one or both of the normal cooling control and the normal heating control described above.

That is, if the control device 19 determines that the network 20 cannot be connected, in other words, if the outside temperature information cannot be acquired through the network 20, the control device 19 monitors a battery temperature detected by the battery temperature sensor 11a without creating a temperature regulating plan, and appropriately operates the temperature regulating device 15 as necessary. Accordingly, the control device 19 can maintain the battery 11 at an appropriate temperature even if the outside temperature information cannot be acquired.

On the other hand, if the control device 19 determines that the communication device 17 can be connected to the network 20 (step S1: Yes), the control device 19 acquires the outside temperature information from the server 100 through the network 20 (step S3).

Next, the control device 19 searches for an intersection time based on the acquired outside temperature information (step S4). Then, the control device 19 determines whether a plurality of intersection times are searched for by the processing of step S4 (step S5). If the control device 19 determines that the plurality of intersection times are not searched for (step S5: No), that is, if one or fewer intersection times are searched for, the control device 19 proceeds to the processing of step S2.

On the other hand, if the control device 19 determines that the plurality of intersection times are searched for (step S5: Yes), the control device 19 predicts a future temperature transition of the battery 11 when it is assumed that the normal temperature regulation control is performed (step S6).

Next, the control device 19 sets a count value N of a counter to 1 (step S7), and sets a period from an N-th intersection time to an (N+1)-th intersection time in the time series as a processing target period (step S8). Accordingly, for example, if the count value N is 1, a period from a first intersection time to a second intersection time is set as the processing target period.

Next, if it is assumed that the temperature of the battery 11 transitions as predicted by the processing of step S6 or processing of step S13 (described later), the control device 19 determines whether a re-reaching time is present in the processing target period set by the processing of step S8 (step S9).

For example, in this case, if the control device 19 sets the period from the first intersection time to the second intersection time as the processing target period, the control device 19 determines whether the re-reaching time is present in the processing target period, assuming that the temperature of the battery 11 transitions as predicted by the processing of step S6. On the other hand, if the control device 19 sets another period (for example, a period from the second intersection time to a third intersection time) as the processing target period, the control device 19 determines whether the re-reaching time is present in the processing target period, assuming that the temperature of the battery 11 transitions as predicted by the processing of step S13.

If the control device 19 determines that the re-reaching time is not present in the processing target period (step S9: No), the control device 19 directly proceeds to the processing of step S11. On the other hand, if the control device 19 determines that the re-reaching time is present in the processing target period (step S9: Yes), the control device 19 creates a temperature regulating plan that causes the re-reaching time to coincide with the intersection time which is the end time of the processing target period (step S10), and proceeds to processing of step S11.

Next, the control device 19 determines whether a period that can be set as the processing target period remains (step S11). If the control device 19 determines that the period that can be set as the processing target period does not remain (step S11: No), the control device 19 controls the temperature regulating device 15 based on the temperature regulating plan created by the processing of step S10 to regulate the temperature of the battery 11 (step S12), and ends the series of processing shown in FIG. 12.

On the other hand, if the control device 19 determines that the period that can be set as the processing target period remains (step S11: Yes), the control device 19 predicts a future temperature transition of the battery 11 when it is assumed that the temperature regulation on the battery 11 is performed based on the temperature regulating plan created by the processing of step S10 (step S13). Then, the control device 19 adds 1 to the count value N (step S14), proceeds to the processing of step S8, and repeats the above processing until the period that can be set as the processing target period does not remain.

As described above, according to the present embodiment, it is possible to reduce the power consumption of the temperature regulating device 15 while maintaining the battery 11 at an appropriate temperature when the vehicle 10 is left unattended. By extension, it is possible to contribute to improvement of energy efficiency of the vehicle 10.

The battery temperature regulating method described in the present embodiment may be implemented by executing a program prepared in advance on a computer. The program is stored in a computer-readable storage medium and executed by being read from the storage medium. In addition, the program may be provided in a form stored in a non-volatile (non-transitory) storage medium such as a flash memory, or may be provided via a network such as the Internet. The computer that executes the program may be included in the vehicle 10 or may be included in an external device (for example, a server) that can communicate with the vehicle 10.

Although an embodiment of the present invention has been described above with reference to the accompanying drawings, it is needless to say that the present invention is not limited to the embodiment described above. It is apparent that those skilled in the art can conceive of various modifications and changes within the scope described in the claims, and it is understood that such modifications and changes naturally fall within the technical scope of the present invention. In addition, the respective constituent elements in the above embodiment may be combined as desired without departing from the gist of the invention.

For example, in the embodiment described above, an example in which the control device according to the present invention is implemented by the control device 19 mounted in the vehicle 10 is described, but the present invention is not limited thereto. For example, the control device according to the present invention may be implemented by the server 100 that can communicate with the control device 19. In this case, for example, the processing of the control device 19 described above may be performed by a processing unit implemented by a CPU of the server 100 or the like. The control device according to the present invention may be implemented by cooperation between the control device 19 and the server 100, and for example, part of the processing of the control device 19 described above may be executed by the server 100.

In the embodiment described above, the control device 19 directly acquires the outside temperature information from the server 100, but the invention is not limited thereto. For example, the control device 19 may acquire the outside temperature information through another device that can communicate with the server 100 (for example, a terminal device of the user of the vehicle 10).

In the embodiment described above, the temperature regulating device 15 is capable of cooling and heating the battery 11 as the temperature regulation on the battery 11, but the present invention is not limited thereto. For example, the temperature regulating device 15 may be configured to perform only one of cooling and heating on the battery 11 as the temperature regulation of the battery 11.

When creating a temperature regulating plan for one day, the control device 19 may perform the same processing as that when creating temperature regulating plans for multiple days shown in FIGS. 7A to 7D and FIG. 11. In this way, even if the outside temperature transitions significantly a plurality of times in one day, not only for multiple days, the outside temperature can be used as much as possible to maintain the battery 11 at an appropriate temperature, thereby reducing the power consumption of the temperature regulating device 15.

In the present specification, at least the following matters are described. Although corresponding constituent elements and the like in the above embodiment are shown in parentheses, the present invention is not limited thereto.

(1) A battery temperature regulating method, in which when a vehicle (vehicle 10) including a battery (battery 11) and a temperature regulating device (temperature regulating device 15, cooling device 15a, and heating device 15b) configured to regulate a temperature of the battery is left unattended, the temperature regulating device is controlled to perform temperature regulation on the battery, a computer (control device 19) executes processing of:

acquiring outside temperature information representing a future outside temperature transition (outside temperature transitions Tout1, Tout2, Tout3, and Tout4) around the vehicle (step S3), searching for an intersection time (intersection times Ct1, Ct2, Ct3, Ct4, Ct11, Ct12, Ct21, Ct22, Ct31, Ct32, Ct41, Ct42, Ct51, Ct52, Ct61, and Ct62), which is a time when the outside temperature becomes a threshold temperature (high-temperature side threshold temperature THi and low-temperature side threshold temperature TLo), based on the outside temperature information (step S4), predicting, based on the outside temperature information, a future temperature transition of the battery (battery temperature transitions Tbat_N1, Tbat_N2, Tbat_N3, and Tbat_N4) when it is assumed that predetermined temperature regulation (normal cooling control and normal heating control) is performed each time the battery reaches the threshold temperature (step S6), creating a temperature regulating plan for the battery, which is performed by the temperature regulating device, based on a search result of the intersection time and a prediction result of the temperature transition of the battery (step S10), and controlling the temperature regulating device based on the temperature regulating plan (step S12), and in the processing of creating the temperature regulating plan, it is determined whether a re-reaching time, which is a time when the battery once reaching the threshold temperature reaches the threshold temperature again, is present before the intersection time, and if it is determined that the re-reaching time is present before the intersection time, the temperature regulating plan in which details of the temperature regulation performed when the battery once reaches the threshold temperature is adjusted is created such that the re-reaching time is brought closer to the intersection time.

According to (1), if it is determined that the re-reaching time when the battery once reaching the threshold temperature reaches the threshold temperature again is present before the intersection time, the temperature regulating plan in which the details of the temperature regulation performed when the battery once reaches the threshold temperature is adjusted is created such that the re-reaching time is brought closer to the intersection time, and the temperature regulating device can be controlled based on the created temperature regulating plan. Accordingly, the outside temperature can be used as much as possible to maintain the battery at an appropriate temperature when the vehicle is left unattended, thereby preventing the temperature from being excessively regulated by the temperature regulating device and reducing power consumption of the temperature regulating device. Accordingly, it is possible to reduce the power consumption of the temperature regulating device that performs temperature regulation on the battery while maintaining the battery at an appropriate temperature when the vehicle is left unattended.

(2) The battery temperature regulating method according to (1), in which in the processing of creating the temperature regulating plan, if it is determined that the re-reaching time is present before the intersection time, the temperature regulating plan in which the details of the temperature regulation performed when the battery once reaches the threshold temperature is adjusted is created such that the re-reaching time coincides with the intersection time.

According to (2), the outside temperature can be used as much as possible to maintain the battery at an appropriate temperature when the vehicle is left unattended, thereby preventing the temperature from being excessively regulated by the temperature regulating device and reducing the power consumption of the temperature regulating device.

(3) The battery temperature regulating method according to (1) or (2), in which the computer further executes processing of:

controlling the temperature regulating device to perform the predetermined temperature regulation each time the battery reaches the threshold temperature if the outside temperature information cannot be acquired.

According to (3), it is possible to maintain the battery at an appropriate temperature while the vehicle is left unattended even when the outside temperature information cannot be acquired.

(4) The battery temperature regulating method according to (1) or (2), in which in the processing of creating the temperature regulating plan, when three or more of the intersection times are searched for, it is determined for each period between the intersection times adjacent in time series whether the re-reaching time is present in the period, and if it is determined that the re-reaching time is present in the period, the temperature regulating plan in which the details of the temperature regulation performed when the battery once reaches the threshold temperature in the period is adjusted is created such that the re-reaching time is brought closer to the intersection time which is an end time of the period.

According to (4), the outside temperature can be used as much as possible to maintain the battery at an appropriate temperature when the vehicle is left unattended for a long period of time, thereby preventing the temperature from being excessively regulated by the temperature regulating device and reducing the power consumption of the temperature regulating device.

(5) A control device (control device 19), in which when a vehicle (vehicle 10) including a battery (battery 11) and a temperature regulating device (temperature regulating device 15, cooling device 15a, and heating device 15b) configured to regulate a temperature of the battery is left unattended, the temperature regulating device is controlled to perform temperature regulation on the battery, the control device includes a processing unit (processing unit 19a) configured to execute processing of:

acquiring outside temperature information representing a future outside temperature transition (outside temperature transitions Tout1, Tout2, Tout3, and Tout4) around the vehicle (step S3), searching for an intersection time (intersection times Ct1, Ct2, Ct3, Ct4, Ct11, Ct12, Ct21, Ct22, Ct31, Ct32, Ct41, Ct42, Ct51, Ct52, Ct61, and Ct62), which is a time when the outside temperature becomes a threshold temperature (high-temperature side threshold temperature THi and low-temperature side threshold temperature TLo), based on the outside temperature information (step S4), predicting, based on the outside temperature information, a future temperature transition of the battery (battery temperature transitions Tbat_N1, Tbat_N2, Tbat_N3, and Tbat_N4) w % ben it is assumed that predetermined temperature regulation (normal cooling control and normal heating control) is performed each time the battery reaches the threshold temperature (step S6), creating a temperature regulating plan (temperature regulating plans PL1a. PL1b, and PL2) for the battery, which is performed by the temperature regulating device, based on a search result of the intersection time and a prediction result of the temperature transition of the battery (step S10), and controlling the temperature regulating device based on the temperature regulating plan (step S12), and when creating the temperature regulating plan.

the processing unit determines whether a re-reaching time, which is a time when the battery once reaching the threshold temperature reaches the threshold temperature again, is present before the intersection time, and if the processing unit determines that the re-reaching time is present before the intersection time, the processing unit creates the temperature regulating plan in which details of the temperature regulation performed when the battery once reaches the threshold temperature is adjusted such that the re-reaching time is brought closer to the intersection time.

According to (5), if it is determined that the re-reaching time when the battery once reaching the threshold temperature reaches the threshold temperature again is present before the intersection time, the temperature regulating plan in which the details of the temperature regulation performed when the battery once reaches the threshold temperature is adjusted such that the re-reaching time is brought closer to the intersection time, and the temperature regulating device can be controlled based on the created temperature regulating plan. Accordingly, the outside temperature can be used as much as possible to maintain the battery at an appropriate temperature when the vehicle is left unattended, thereby preventing the temperature from being excessively regulated by the temperature regulating device and reducing power consumption of the temperature regulating device. Accordingly, it is possible to reduce the power consumption of the temperature regulating device that performs temperature regulation on the battery while maintaining the battery at an appropriate temperature when the vehicle is left unattended.

What is claimed is:

1. A battery temperature regulating method, wherein when a vehicle including a battery and a temperature regulating device configured to regulate a temperature of the battery is left unattended, the temperature regulating device is controlled to perform temperature regulation on the battery, a computer executes processing of:

acquiring outside temperature information representing a future outside temperature transition around the vehicle, searching for an intersection time, which is a time w % ben the outside temperature becomes a threshold temperature, based on the outside temperature information, predicting, based on the outside temperature information, a future temperature transition of the battery when it is assumed that predetermined temperature regulation is performed each time the battery reaches the threshold temperature, creating a temperature regulating plan for the battery, which is performed by the temperature regulating device, based on a search result of the intersection time and a prediction result of the temperature transition of the battery, and controlling the temperature regulating device based on the temperature regulating plan, and in the processing of creating the temperature regulating plan, it is determined whether a re-reaching time, which is a time when the battery once reaching the threshold temperature reaches the threshold temperature again, is present before the intersection time, and if it is determined that the re-reaching time is present before the intersection time, the temperature regulating plan in which details of the temperature regulation performed when the battery once reaches the threshold temperature is adjusted is created such that the re-reaching time is brought closer to the intersection time.

2. The battery temperature regulating method according to claim 1, wherein in the processing of creating the temperature regulating plan, if it is determined that the re-reaching time is present before the intersection time, the temperature regulating plan in which the details of the temperature regulation performed when the battery once reaches the threshold temperature is adjusted is created such that the re-reaching time coincides with the intersection time.

3. The battery temperature regulating method according to claim 1, wherein the computer further executes processing of:

controlling the temperature regulating device to perform the predetermined temperature regulation each time the battery reaches the threshold temperature if the outside temperature information cannot be acquired.

4. The battery temperature regulating method according to claim 1, wherein in the processing of creating the temperature regulating plan, when three or more of the intersection times are searched for, it is determined for each period between the intersection times adjacent in time series whether the re-reaching time is present in the period, and if it is determined that the re-reaching time is present in the period, the temperature regulating plan in which the details of the temperature regulation performed when the battery once reaches the threshold temperature in the period is adjusted is created such that the re-reaching time is brought closer to the intersection time which is an end time of the period.

5. A control device, wherein when a vehicle including a battery and a temperature regulating device configured to regulate a temperature of the battery is left unattended, the temperature regulating device is controlled to perform temperature regulation on the battery, the control device comprises a processing unit configured to execute processing of:

acquiring outside temperature information representing a future outside temperature transition around the vehicle, searching for an intersection time, which is a time when the outside temperature becomes a threshold temperature, based on the outside temperature information, predicting, based on the outside temperature information, a future temperature transition of the battery when it is assumed that predetermined temperature regulation is performed each time the battery reaches the threshold temperature, creating a temperature regulating plan for the battery, which is performed by the temperature regulating device, based on a search result of the intersection time and a prediction result of the temperature transition of the battery, and controlling the temperature regulating device based on the temperature regulating plan, and when creating the temperature regulating plan, the processing unit determines whether a re-reaching time, which is a time when the battery once reaching the threshold temperature reaches the threshold temperature again, is present before the intersection time, and if the processing unit determines that the re-reaching time is present before the intersection time, the processing unit creates the temperature regulating plan in which details of the temperature regulation performed when the battery once reaches the threshold temperature is adjusted such that the re-reaching time is brought closer to the intersection time.

* * * * *